United States Patent [19]
Bass et al.

[11] 3,748,765
[45] July 31, 1973

[54] ILLUMINATED EDUCATIONAL PICTURE VIEWER TOY

[75] Inventors: Sidney Bass, Los Angeles; John T. Benson, Encino; Darold M. Shirwo, Beverly Hills, all of Calif.

[73] Assignee: Mattel, Inc., Hawthorne, Calif.

[22] Filed: Jan. 7, 1972

[21] Appl. No.: 216,217

[52] U.S. Cl. ............... 40/63 A, 40/106.1, 40/132 D
[51] Int. Cl. ............................................. G07f 11/30
[58] Field of Search ...................... 40/130 B, 132 D, 40/106.1, 86 A, 63 A, 64 A, 70 A; 353/68, 72, 74, 75, 79, 80, 96, 108, 110; 35/9 D, 9 C, 8 R

[56] References Cited
UNITED STATES PATENTS

| | | | |
|---|---|---|---|
| 2,369,483 | 2/1945 | Musebeck | 40/70 A |
| 2,570,913 | 10/1951 | Brown | 40/70 A X |
| 2,773,323 | 12/1956 | Gorwitz | 40/70 A |
| 2,834,251 | 5/1958 | Romrell | 40/63 A X |
| 2,467,014 | 4/1949 | Dilks | 40/70 A X |
| 3,376,782 | 4/1968 | Whitley et al. | 40/70 A X |
| 2,379,534 | 7/1945 | Lowden | 40/130 B X |
| 2,492,571 | 12/1949 | Goldfarb | 35/9 D UX |

FOREIGN PATENTS OR APPLICATIONS 947,228  1/1964  Great Britain ..................... 40/64 A Primary Examiner—Robert W. Michell
Assistant Examiner—George M. Yahwak
Attorney—Seymour A. Scholnick

[57] ABSTRACT

Pictorial transparency has one picture located in each corner intermediate the bottom wall and top of a square, hollow cube having its bottom wall provided with an aperture beneath each picture and its top closed by a translucent viewing screen upon which each picture may be viewed separately by positioning the cube in a square viewer having an aperture in one corner in a position such that one cube aperture and its associated picture will be juxtaposed over viewer aperture when cube is placed in viewer. A light bulb is illuminated beneath the viewer aperture when cube closes switch. Next picture may be viewed by removing cube, rotating cube one-quarter turn and replacing cube in viewer.

10 Claims, 7 Drawing Figures

PATENTED JUL 31 1973

3,748,765

ILLUMINATED EDUCATIONAL PICTURE VIEWER TOY

BACKGROUND OF THE INVENTION

The background of the invention will be set forth in two parts.

1. Field of the Invention

The invention pertains generally to the field of amusement and educational devices and more particularly to illuminated educational picture viewer toys.

2. Description of the Prior Art

U.S. Pat. Nos. 2,654,173; 3,072,013; and 3,194,113 give examples of prior art transparency viewing devices and U.S. Pat. No. 3,225,460 discloses one prior art example of an amusement and educational device including a cube having faces containing illuminatable objects.

OBJECTS AND SUMMARY OF THE INVENTION:

A primary object of the present invention is to provide a new and useful illuminated educational picture viewer toy exemplifying improvements over the prior art.

Another object of the present invention is to provide a toy of the type described including a new and useful viewer base and picture-block combination.

According to the present invention, an illuminated educational picture viewer toy includes a viewer base having an open top of a predetermined geometric shape and a bottom wall. An aperture is provided in the bottom wall and is located closer to the outer perimeter of the base than to the center thereof. A light source is provided adjacent this aperture in the base.

The viewer toy also includes a picture block having an encompassing side wall, a closed bottom wall and an open top. A translucent screen is mounted in the open top and a plurality of transparencies are positioned in the block intermediate the bottom wall and screen. The transparencies have a predetermined location correlated to the location of the aperture in the base such that each transparency may be placed in juxtaposition to the aperture in the base by placing the block in the base in a different rotated position for each transparency. A plurality of apertures are provided in the bottom wall of the block in the same number as, and at locations juxtaposed to, the transparencies so that light from the source may be transmitted through the aperture in the base and through a juxtaposed aperture in the block for projecting a juxtaposed picture onto the screen.

The features of the present invention which are believed to be novel are set forth with particularity in the appended claims. The present invention, both as to its organization and manner of use, together with further objects and advantages thereof, may best be understood by reference to the following description, taken in connection with the accompanying drawings in which like referenced characters refer to like elements in the several views.

Figure 2:
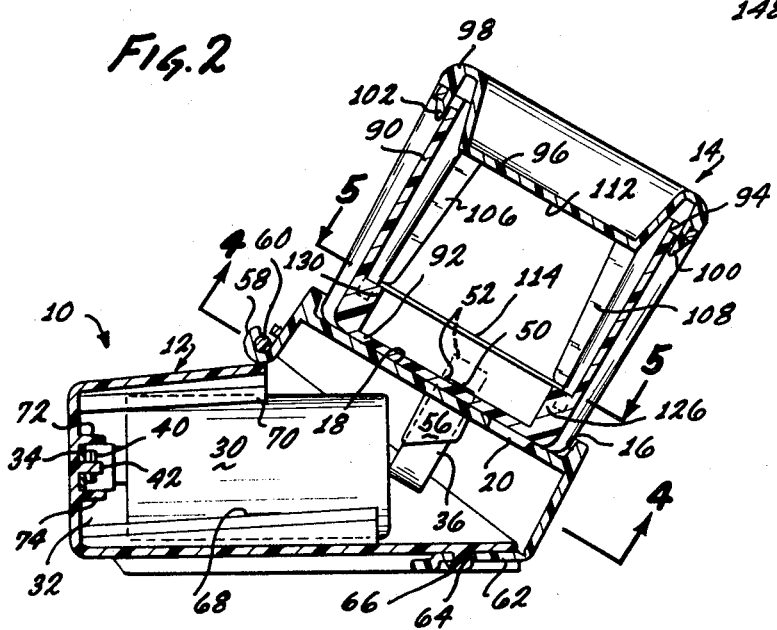
FIG. 2 is a vertical, cross-sectional view of the toy of FIG. 1.
Figure 5:
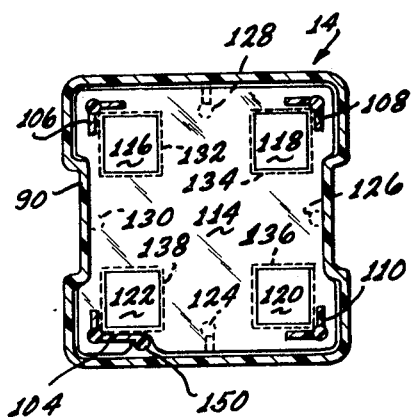
FIG. 5 is a cross-sectional view taken along line 5—5 of FIG. 2.

DESCRIPTION OF THE PREFERRED EMBODIMENT:

Referring again to the drawings, and more particularly to FIGS. 2 and 5, an illuminated educational picture viewer toy constituting a presently preferred embodiment of the invention, generally designated 10, includes a viewer base 12 and a picture block 14.

Viewer base 12 has an open top 16 of a predetermined geometric shape, which is shown herein for purposes of illustration, but not of limitation, as being square, and a bottom wall 18. An aperture 20 is provided in bottom wall 18 and is located closer to the outer perimeter 22 thereof than to the center 24 thereof. A light source in the form of a light bulb 26 is provided in base 12 adjacent aperture 20 for energization by a pair of dry cells 28, 30 (FIG. 7) mounted in a battery-housing portion 32 of base 12 and connected together in series through a metal tab 34. Referring now to FIGS. 1, 2, 4 and 7, bulb 26 is held in engagement with battery 28 by means to be hereinafter described and is engaged by a movable contact 36. Movable contact 36 includes an intermediate portion 38 having a gripper 40 engaging a fixed pin 42 depending from bottom wall 18 of base 12, an L-shaped fixed end 44 having a slot 46 gripping a flange 48 on bulb 26, a free end 50 having a reversely bent portion 52 extending up through an opening 54 in bottom wall 18 and a depending portion 56 adapted to engage battery 30 completing a circuit to bulb 26 when block 14 is placed on bottom wall 18, thereby depressing portion 52.

Bottom wall 18 is swingably connected to battery-housing 32 by a hinge 58 engaging a fixed rod 60 on housing 32 and is maintained in a closed position by a swingable hasp 62 having an aperture 64 engaging a fixed hook 66 on housing 32. Batteries 28, 30 may each be maintained in position in housing 32 by a pair of lower ribs, like the one shown at 68 in FIG. 2 for the battery 30, and a pair of upper ribs, like the one shown at 70 in FIG. 2 for battery 30, which are formed integrally with housing 32 when it is molded from a suitable plastic material. A pair of spaced, horizontal ribs 72, 74 and a fixed pin 76 may also be formed during this molding operation for retaining metal tab 34 in position in housing 32.

Figure 4:
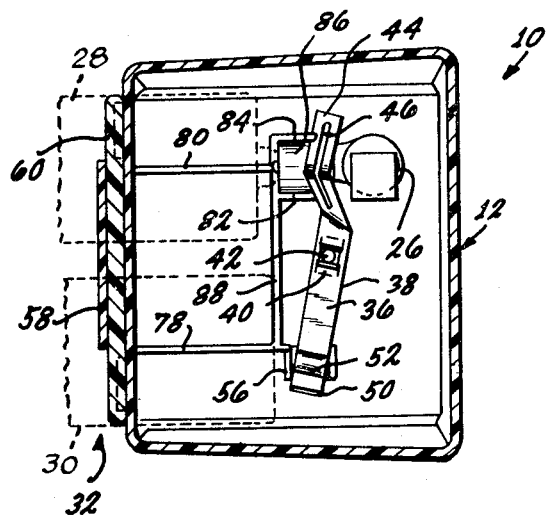
FIG. 4 is a cross-sectional view taken along line 4—4 of FIG. 2.
Figure 6:
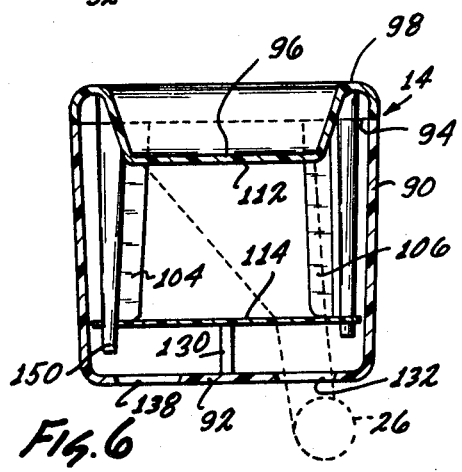
FIG. 6 is a vertical cross-sectional view of the picture block portion of the toy of FIG. 1.

As best seen in FIG. 4, a pair of ribs 78, 80 may depend from bottom wall 18 to prevent batteries 28, 30 from being displaced upwardly in housing 32. Additionally, a pair of tabs 82, 84 may depend from bottom wall 18 to grip the base portion 86 of bulb 26 and a reinforcing rib 88 may be used to connect the end of tabs 82, 84 and ribs 78, 80.

Referring now more in particular to FIGS. 1–3 and 5–6, picture block 14 includes an encompassing side wall 90, a closed bottom wall 92 and an open top 94. A translucent screen 96 is positioned in open top 94 and is formed integrally with a cap 98, which encompasses open top 94 and is secured in position thereon by clips 100, 102 depending from cap 98, and a plurality of depending, picture-locating members 104, 106, 108 and 110. These members may be made from a suitable plastic material, such as polystyrene and the lower surface 112 of screen 96 is preferably given a sand-blasted finish by providing a sand-blasted finish in the mold.

Picture block 14 also includes a transparency carrier 114 positioning a plurality of transparencies 116, 118, 120 and 122 in block 14 on support member 124, 126, 128 and 130 intermediate bottom wall 92 and screen 96. These transparencies have a predetermined location, shown herein for purposes of illustration, but not of limitation, as being in each corner of a square transparency carrier, correlated to the location of the aperture 20 in base 12 such that each transparency 116, 118, 120 and 122 may be placed in juxtaposition to aperture 20 by placing block 14 in base 12 in a different rotated position for each transparency.

Bottom wall 92 of block 14 is provided with (FIG. 5) a plurality of apertures 132, 134, 136 and 138 located in juxtaposition to transparencies 116, 118, 120 and 122, respectively, whereby light from bulb 26 may be transmitted through aperture 20 in base 12 and through a juxtaposed aperture in block 14 for projecting as juxtaposed picture onto screen 96.

Figure 1:
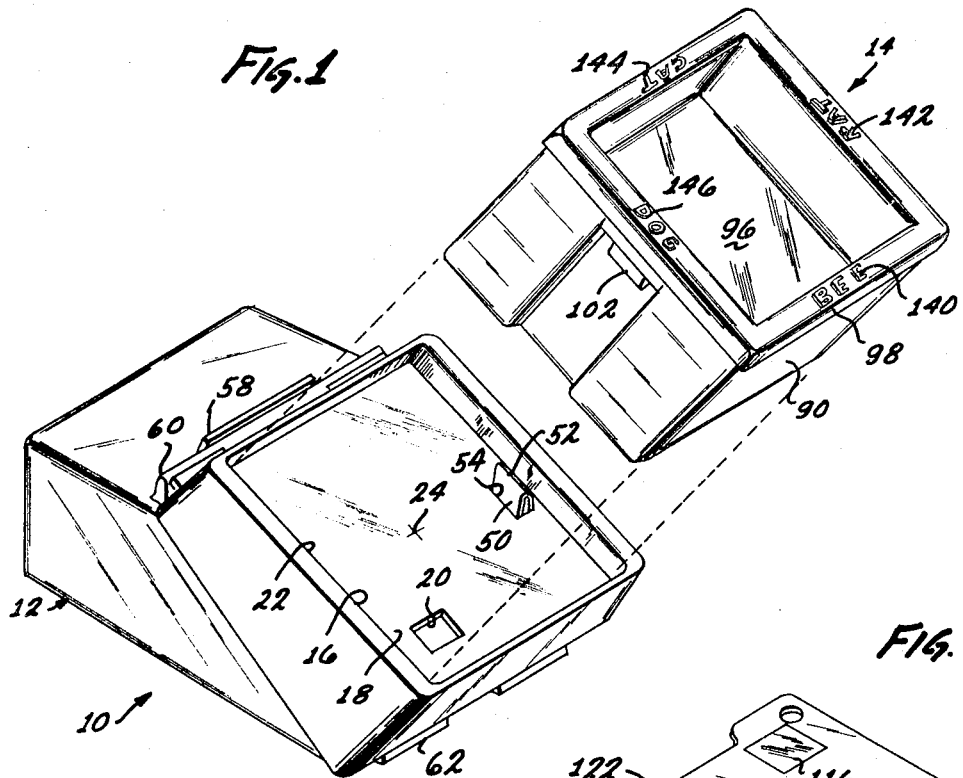
FIG. 1 is an exploded, perspective view of an illuminated educational picture viewer toy constituting a presently preferred embodiment of the invention.
Figure 3:
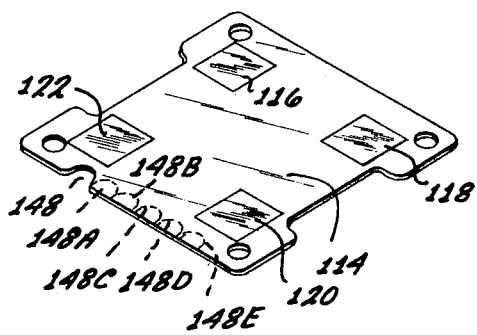
FIG. 3 is a perspective view of a transparency carrier used in the toy of FIG. 1.

Referring now more in particular to FIGS. 1 and 3, the educational and play value of toy 10 is enhanced by associating a work with each picture. When block 14 is in viewing position on base 12, one of the indicia 140, 142, 144 and 146 will be in position to be read by a child-user for each rotated position of block 14. These indicia are correlated to transparencies 116, 118, 120 and 122 such that a child-user may view a picture on screen 96 and read a work describing the picture. For example, when a bee is shown on screen 96, the child-user may read the work "bee." This correlation is accomplished by providing carrier 114 with a notch 148 having a predetermined location matching the location of a depending finger 150 (FIGS. 5 and 6) carried by picture locating member 104. FIG. 3 indicates other locating notches schematically at 148A, 148B, 148C, 148D and 148E indicating that six different sets of transparency carriers and screen assemblies 96 may be provided. It will be apparent to those skilled in the art that the depending finger 150 on picture-locating member 104 would be located in a different lateral position for each set and that this position will correspond to the location of an associated one of the notches 148. This facilitates assemblying block 14 by assuring that the correct transparency carrier 114 and screen assembly 96 will be used for a particular block 14.

It will also be apparent to those skilled in the art that toy 10 may be supplied with a single base 12 and from one to six blocks 14 having different sets of indicia 140, 142, 144 and 146 displayed thereon.

Figure 7:
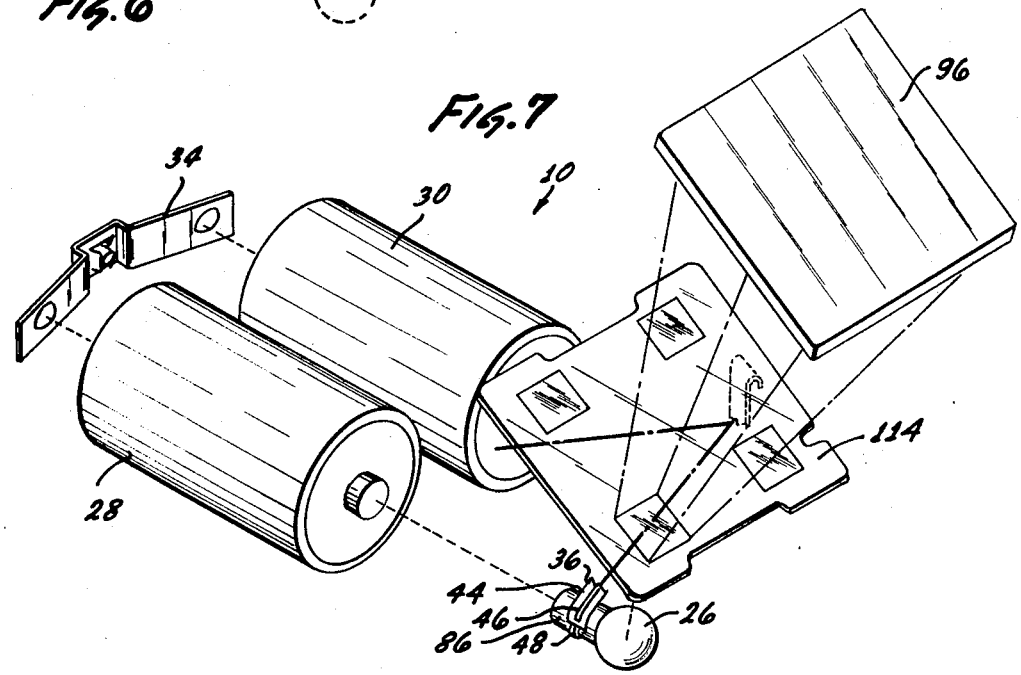
FIG. 7 is a partial, exploded perspective view showing somewhat schematically the electrical system of the toy of FIG. 1.

The manner of using toy 10 will be described in connection with FIGS. 1 and 7. A child-user may select a block 14 and place it in opening 16 on base 12 and any rotated position. Bottom wall 92 of carrier 14 will then engage portion 52 of contact 36 moving portion 56 into engagement with battery 30 closing a circuit through battery 28 and bulb 26. Assuming that block 14 is in the rotated position shown in FIG. 1, the child-user will be able to read the word "bee" and light from bulb 26 will pass through aperture 20 in base 12 and aperture 138 in carrier 114 for projecting picture 122 onto screen 96.

The child-user may then remove block 14, rotate it 90° and place it back into opening 16 for viewing the next picture.

While the particular illuminated educational picture viewer toy herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure.

What is claimed is:

1. An illuminated educational picture viewer toy, comprising:

a viewer base having a wall, said wall having a first surface and a second surface, an aperture provided in said wall closer to the outer perimeter thereof than to the center thereof and a light source positioned adjacent said first surface and said aperture; and a picture block having an encompassing side wall and an open top, a translucent screen provided in said open top and a plurality of picture transparencies positioned transversely in said block adjacent said screen, said transparencies having a predetermined location correlated to the location of the aperture in said base such that each transparency may be placed in juxtaposition to the aperture in said base by placing said block on said second surface of said base in a different rotated position for each transparency, whereby light from said source may be transmitted through said aperture in said base and through a juxtaposed transparency for projecting a juxtaposed picture onto said screen.

2. A viewer toy as stated in claim 1 wherein said viewer base includes an encompassing sidewall and an open top having a predetermined geometric shape, wherein said wall in said base is a bottom wall and wherein said picture block has said predetermined geometric shape and is positioned on said bottom wall through the open top of said base.

3. A viewer toy as stated in claim 2 wherein said block has a bottom wall provided with apertures juxtaposed to said transparencies.

4. A viewer toy as stated in claim 3 wherein said light source is an electric light bulb and wherein said toy includes a switch for closing a circuit to said light bulb, said switch being located on said base bottom wall for engagement and actuation by said block bottom wall.

5. A viewer toy as stated in claim 4 wherein said predetermined geometric shape is square, wherein four transparencies are mounted in said block and wherein indicia are provided on said block for identifying said projected pictures.

6. A viewer toy as stated in claim 5 wherein said viewer base includes a battery compartment for holding battery means supplying current to said light bulb.

7. A viewer toy as stated in claim 6 wherein said switch includes an intermediate portion gripping a pin depending from said base bottom wall, an L-shaped, fixed end having a slot gripping said light bulb and a free end having a reversely-bent portion extending through an aperture in said base bottom wall and a portion positioned adjacent said battery means for engagement therewith when said free end is moved by positioning said block on said reversely-bent portion.

8. A viewer toy as stated in claim 1 wherein said screen is made from a polystyrene material and is formed in a mold having a sandblasted finish on one surface thereof.

9. An illuminated educational picture viewer toy, comprising:
- a viewer base having an open top of a predetermined geometric shape and a bottom wall, an aperture provided in said bottom wall closer to the outer perimeter thereof than to the center thereof and a light source adjacent said aperture; and
- a picture block having an encompassing side wall, a closed bottom wall and an open top, a translucent screen provided in said open top and a plurality of transparencies positioned in said block intermediate said bottom wall and said screen in a plane parallel to the plane of said screen, said transparencies having a predetermined location correlated to the location of the aperture in the base such that each transparency may be placed in juxtaposition to the aperture in the base by placing said block in said base in a different rotated position for each transparency, and a plurality of apertures in said bottom wall of said block in the same number as, and at locations juxtaposed to, said transparencies, whereby light from said source may be transmitted through said aperture in said base and through a juxtaposed aperture in said block for projecting a juxtaposed picture onto said screen.

10. A picture viewer toy comprising:
- viewer base means having an aperture provided therein;
- light source means in said base for passing light rays through said aperture;
- separate picture-carrying housing means manually positionable in a plurality of different positions relative to said aperture in said base means and including screen means and a transparency carrier having a plurality of transparencies thereon and received within said housing, said transparencies having a predetermined location correlated to the locations of said aperture and said screen means such that each transparency may be selectively positioned with respect to said aperture in such a manner that a transparency so positioned will have its picture projected onto said screen means; and
- cooperating engaging and readily disengageable means fixed respectively on said base means and picture-carrying means for aligning a transparency with said aperture in each of said different positions.

* * * * *